United States Patent
Watanabe (10) Patent No.: US 9,752,445 B2
(45) Date of Patent: Sep. 5, 2017

(54) METHOD FOR PRODUCING COUPLED TURBINE VANES, AND TURBINE VANES

(71) Applicant: IHI Corporation, Koto-ku (JP)

(72) Inventor: Fumiaki Watanabe, Tokyo (JP)

(73) Assignee: IHI Corporation, Koto-ku (JP)

( * ) Notice: Subject to any disclaimer, the term of this patent is extended or adjusted under 35 U.S.C. 154(b) by 395 days.

(21) Appl. No.: 14/479,593

(22) Filed: Sep. 8, 2014

(65) Prior Publication Data

US 2015/0003978 A1   Jan. 1, 2015

Related U.S. Application Data

(63) Continuation of application No. PCT/JP2013/060220, filed on Apr. 3, 2013.

(30) Foreign Application Priority Data

Apr. 10, 2012   (JP) ................. 2012-089557

(51) Int. Cl.
*F01D 5/22* (2006.01)
*F01D 5/28* (2006.01)
(Continued)

(52) U.S. Cl.
CPC ............... *F01D 9/02* (2013.01); *F01D 5/225* (2013.01); *F01D 5/282* (2013.01); *F01D 9/042* (2013.01);
(Continued)

(58) Field of Classification Search
CPC . F01D 5/225; F01D 5/282; F01D 9/04; F01D 9/042; F01D 9/044; F05D 2230/50;
(Continued)

(56) References Cited

U.S. PATENT DOCUMENTS

| 6,648,597 | B1 | 11/2003 | Widrig et al. |
| 7,510,379 | B2 * | 3/2009 | Marusko ................. F01D 5/282 |
| | | | 29/889.7 |

(Continued)

FOREIGN PATENT DOCUMENTS

| CN | 101042055 A | 9/2007 |
| CN | 101208191 A | 6/2008 |

(Continued)

OTHER PUBLICATIONS

International Search Report issued on Jun. 11, 2013 for PCT/JP2013/060220 filed on Apr. 3, 2013 with English Translation.

(Continued)

*Primary Examiner* — Christopher Verdier
*Assistant Examiner* — Christopher R Legendre
(74) *Attorney, Agent, or Firm* — Oblon, McClelland, Maier & Neustadt, L.L.P.

(57) ABSTRACT

Coupled turbine vanes having an axis are produced by arranging a plurality of first fabrics of ceramic fibers in radial directions relative to the axis to constitute a plurality of vane sections, arranging a second fabric of the ceramic fibers in a circumferential direction relative to the axis, connecting the first fabrics with the second fabric by bending first ends of the first fabrics to lay them on the second fabric in parallel, and impregnating the plurality of first fabrics connected with the second fabric with the matrix.

6 Claims, 8 Drawing Sheets

(51) Int. Cl.
*F01D 9/04* (2006.01)
*F01D 9/02* (2006.01)

(52) U.S. Cl.
CPC .... *F05D 2230/50* (2013.01); *F05D 2300/601* (2013.01); *F05D 2300/6033* (2013.01); *Y02T 50/672* (2013.01); *Y10T 29/49321* (2015.01); *Y10T 29/49337* (2015.01)

(58) Field of Classification Search
CPC ........... F05D 2230/53; F05D 2300/601; F05D 2300/603; F05D 2300/6033; Y10T 29/49321; Y10T 29/49323; Y10T 29/49336; Y10T 29/49337
See application file for complete search history.

(56) References Cited

U.S. PATENT DOCUMENTS

| | | | | |
|---|---|---|---|---|
| 7,926,761 | B2 * | 4/2011 | Coupe | B29C 70/24 244/102 A |
| 8,607,454 | B2 * | 12/2013 | Blanchard | B29C 70/24 156/148 |
| 8,734,605 | B2 * | 5/2014 | Harrison | B29C 66/126 156/242 |
| 9,022,733 | B2 * | 5/2015 | Coupe | C04B 35/524 29/419.1 |
| 9,062,562 | B2 * | 6/2015 | Coupe | F01D 25/00 |
| 9,308,708 | B2 * | 4/2016 | Kleinow | B32B 18/00 |
| 9,427,834 | B2 * | 8/2016 | Fremont | B29B 11/16 |
| 9,605,543 | B2 * | 3/2017 | Nunez | C04B 35/571 |
| 2002/0064456 | A1 | 5/2002 | Marlin et al. | |
| 2011/0311368 | A1 | 12/2011 | Coupe et al. | |
| 2012/0055609 | A1 | 3/2012 | Blanchard et al. | |
| 2014/0133989 | A1 * | 5/2014 | Belmonte | F01D 9/02 416/204 A |
| 2014/0227088 | A1 * | 8/2014 | Beaujard | F01D 5/282 415/173.4 |
| 2014/0322024 | A1 * | 10/2014 | Watanabe | C04B 35/80 416/230 |
| 2015/0003978 | A1 * | 1/2015 | Watanabe | F01D 5/282 415/208.1 |
| 2016/0273372 | A1 * | 9/2016 | Podgorski | B29C 70/48 |

FOREIGN PATENT DOCUMENTS

| | | |
|---|---|---|
| CN | 102387908 A | 3/2012 |
| EP | 2 363 574 A2 | 9/2011 |
| EP | 2 392 778 A2 | 12/2011 |
| FR | 2 939 129 A1 | 6/2010 |
| JP | 7-189607 A | 7/1995 |
| JP | 2003-148105 A | 5/2003 |

OTHER PUBLICATIONS

International Written Opinion mailed on Jun. 11, 2013 for PCT/JP2013/060220 filed on Apr. 3, 2013.
Combined Chinese Office Action and Search Report issued Sep. 6, 2015 in Patent Application No. 201380016815.2 (with English language translation).
Extended Search Report issued Nov. 4, 2015 in European Patent Application No. 13775470.1.

* cited by examiner

METHOD FOR PRODUCING COUPLED TURBINE VANES, AND TURBINE VANES

CROSS-REFERENCE TO RELATED APPLICATIONS

This application is a Continuation Application of PCT International Application No. PCT/JP2013/060220 (filed Apr. 3, 2013), the entire contents of which are incorporated herein by reference.

BACKGROUND OF THE INVENTION

Field of the Invention

The present invention relates to coupled vanes of a turbine applied to an aeronautic engine for example, and a method of production thereof.

Description of the Related Art

Figure 13A:
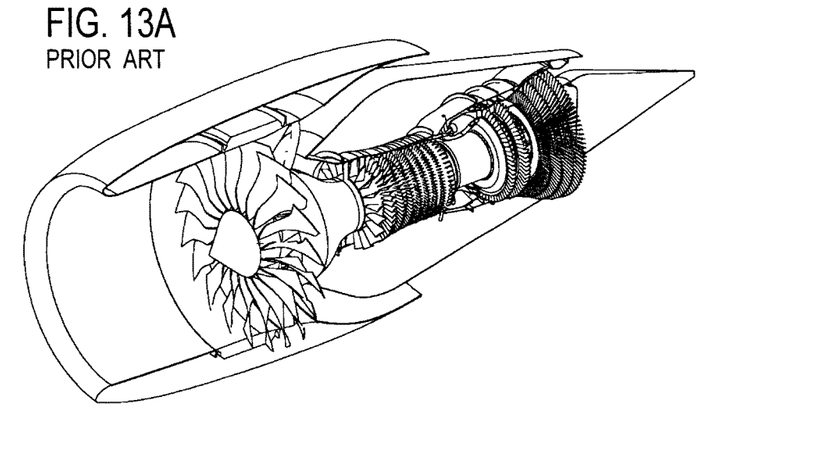
FIG. 13A is a schematic perspective view of an aeronautic turbofan engine according to the prior art.
Figure 13B:
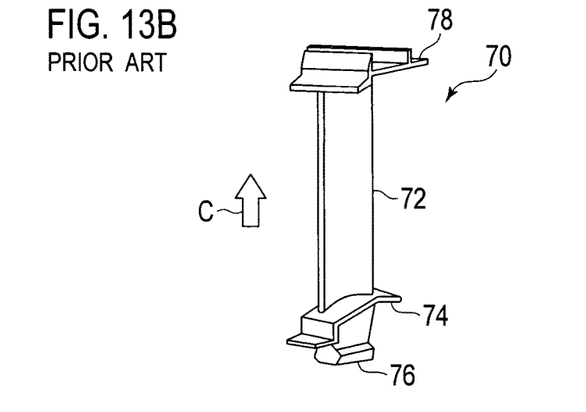
FIG. 13B is a schematic perspective view in which a part of its turbine rotor vanes is enlarged.

On a turbine vane as one of components of a jet engine for example, in use, acts an intense stress due to strong centrifugal force or gas flow. Since particularly high strength as well as thermal resistance is therefore necessary for such a turbine vane, metal materials are generally used for production. While FIG. 13A is a general perspective view of a typical aeronautic turbofan engine and FIG. 13B is a general perspective view in which a part of its turbine rotor vanes is enlarged, because a strong centrifugal force C acts on the turbine rotor vane, the turbine rotor vane is in general produced from any of Ni-based alloys or such. Further, as shown in FIG. 13B, although a turbine rotor vane has a complex shape comprising a vane section 72, a platform section 74 elongated in a vertical direction relative to faces of the vane, a dovetail section 76 disposed at one end of the vane section 72, and a tip shroud section 78 elongated in a vertical direction relative to the faces of the vane at another end, it is readily produced by casting a metal material such as a Ni-based alloy. The similar applies to turbine stator vanes and any of them has a complex shape but is readily produced by using a metal material such as a Ni-based alloy.

Figure 13C:
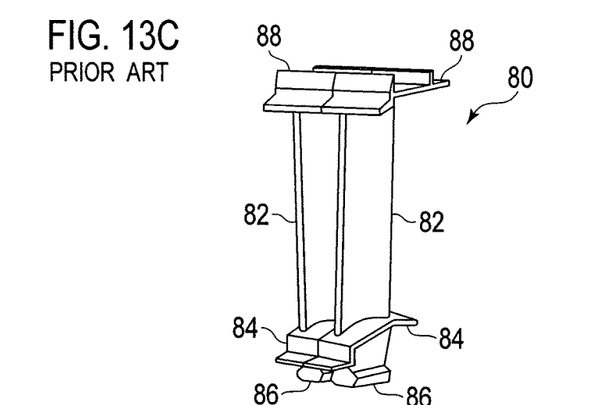
FIG. 13C is a schematic perspective view in which turbine rotor vanes of a coupled-vane structure are enlarged.

Turbine vanes may be used either as single vanes or as coupled vanes. In a case of rotor vanes, tip shroud sections are mutually joined, thereby being made into coupled vanes. In a case of stator vanes, a shroud section (outer band section) and a platform section (inner band section) of each vane may be respectively joined to these counterparts so that coupled vanes are made, or coupled vanes are integrally formed by casting. FIG. 13C is a schematic perspective view depicting a turbine rotor vane of a coupled-vane structure, in which a coupled-vane 80 is comprised of vane sections 82, platform sections 84 elongated in vertical directions relative to faces of the vanes, dovetail sections 86 disposed at one ends of the vane sections 82, and tip shroud sections 88 elongated in vertical directions relative to the faces of the vanes at another ends. In this case, its shape comes to be more complex but can be produced by using an advanced mold.

And, in recent years, ceramic matrix composites (CMC), each of which is comprised of a ceramic fiber fabric and a ceramic matrix, are expected to be applied to turbine vanes. As ceramic matrix composites are superior in light of weight and thermal resistance, if they can be used as turbine vanes, it could be expected to reduce weight of engines and reduce fuel consumption rates.

Figure 14:
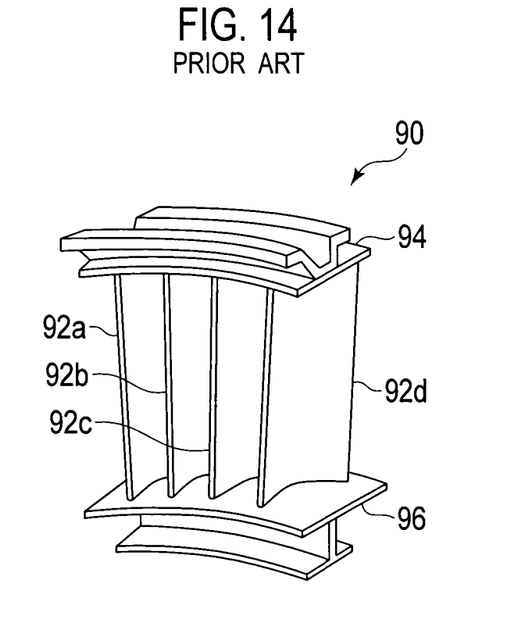
FIG. 14 is a schematic perspective view illustrating turbine rotor vanes of a coupled-vane structure according to the prior art.

Some proposals for turbine vanes to which ceramic matrix composites are applied and production methods have been so far brought forward. Further there have been proposals for turbine vanes of coupled-vane structures exemplified in FIG. 14 (see PTL 1 or 2 below for example). FIG. 14 is that in which four turbine stator vanes are coupled and the turbine stator vane 90 of a coupled-vane structure is comprised of vane sections 92a, 92b, 92c, 92d, an outer band section 94 and an inner band section 96 respectively elongated in vertical directions relative to faces of the vanes. Among these four vane sections 92a, 92b, 92c and 92d, to the outer band section 94 and the inner band section 96 applied is adhesive to bond them or they are mechanically connected.

U.S. Pat. No. 6,648,597 (PTL 1) and Japanese Patent Application Laid-open No. H07-189607 (PTL 2) disclose related arts.

SUMMARY OF THE INVENTION

The cause that ceramic matrix composites exhibit high strength largely depends on reinforcement fibers in matrixes. Interfaces of adhesion or mechanical joining, however, render reinforcement fibers cut there and are therefore prominently inferior in strength as compared with regions where the fibers are continuous. If some reinforcement members were added in order to assure strength, the quality of light-weight as an advantage of the ceramic matrix composites would be impaired. The present invention has been achieved in light of these problems.

According to a first aspect of the present invention, a method for producing coupled vanes of a turbine having an axis is comprised of: arranging a plurality of first fabrics of ceramic fibers in radial directions relative to the axis to form a plurality of vane sections; arranging a second fabric of the ceramic fibers in a circumferential direction relative to the axis; connecting the first fabrics with the second fabric by bending and laying first ends of the first fabrics on the second fabric in parallel; incorporating the first fabrics connected with the second fabric into a mold to mold the first and second fabrics into a unitary body; and impregnating the plurality of first fabrics and the second fabric molded into the unitary body with a matrix.

According to a second aspect of the present invention, coupled vanes of a turbine having an axis are comprised of: a plurality of vane sections comprising a plurality of first fabrics of ceramic fibers arranged in radial directions relative to the axis; and a tip shroud section or an outer band section, wherein a second fabric of the ceramic fibers is arranged in a circumferential direction relative to the axis, wherein the first fabrics are connected with the second fabric by bending and laying first ends of the first fabrics on the second fabric in parallel, wherein the first and second fabrics are molded into a unitary body by incorporating the first fabrics connected with the second fabric into a mold, and wherein the plurality of first fabrics and the second fabric molded into the unitary body is impregnated with a matrix.

Because the first and second fabrics are, after being overlapped in parallel, impregnated with the matrix so that fibers thereof overlap each other and then join together, coupled vanes of a turbine are produced with sufficient strength.

DETAILED DESCRIPTION OF THE EXEMPLARY EMBODIMENTS

Exemplary embodiments of the present invention will be described hereinafter with reference to the appended drawings.

According to the respective embodiments, a composite member in which a plurality of members of a ceramic composite material is joined together can be produced, and, as a composite member produced thereby exemplified are coupled vanes in which a plurality of rotor vanes or stator vanes of a turbine is combined. From a ceramic fabric, fabrics for vane sections and a fabric for a connecting section are prepared, and the plural fabrics of the vane sections are joined by the fabric for the connecting section, and are thereafter incorporated into a mold and molded into a unitary body, and an obtained molded body is impregnated with a ceramic matrix, thereby producing the coupled vanes. In a case of rotor vanes, the connecting section is a tip shroud section, and, in a case of stator vanes, the connecting section is an outer band section.

Figure 1A:
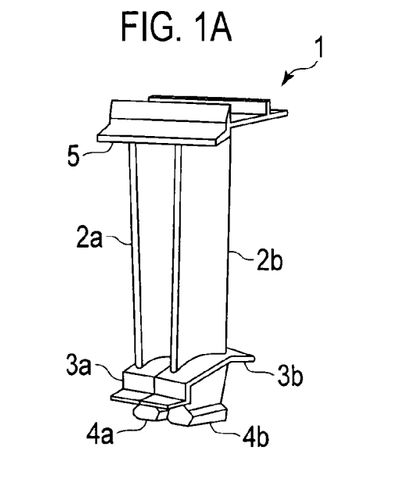
FIG. 1A is a schematic perspective view illustrating coupled vanes applied to rotor vanes in accordance with an embodiment of the present invention.

FIG. 1A is a schematic perspective view for illustrating the coupled vanes for the rotor vanes in accordance with one embodiment of the present invention.

As shown in FIG. 1A, the coupled vanes 1 for the rotor vanes according to the present embodiment include a plurality (two, exemplified in FIG. 1A) of vane sections. The coupled vanes 1 for the rotor vanes according to the present embodiment as shown in FIG. 1A are comprised of two vane sections 2a,2b elongated in radial directions relative to an axis of the turbine, platform sections 3a,3b elongated in vertical directions relative to these vane faces (in a circumferential direction relative to the axis of the turbine), and dovetail sections 4a,4b arranged in inner ends of the vane sections 2a,2b. And, two vane sections 2a,2b are connected at outer ends thereof by a single tip shroud section 5. More specifically, whereas the coupled vanes 1 for the rotor vanes according to the present embodiment are comprised of the plurality of rotor vanes having similar shapes of rotor vanes of the prior art, the coupled vanes 1 differ from those of the prior art in that the single tip shroud section unitarily connects the plurality of rotor vanes together.

The dovetail sections 4a,4b of the coupled vanes 1 for the rotor vanes as described are made fit in a disk and, when the disk rotates, strong centrifugal force acts thereon in longitudinal directions of the vane sections 2a,2b.

Because in the coupled vanes 1 according to the present embodiment exemplified in FIG. 1A, as described later in more detail, the respective fabrics are of a ceramic fabric, and the coupled vanes 1 are produced by, after connecting two fabrics constituting two vane sections 2a,2b (the fabric for the vane sections) by the fabric constituting the tip shroud section 5 (the fabric for the connecting section), incorporating them into a mold and molding them into a unitary body, impregnating the obtained molded body with the ceramic matrix, and fibers therein overlap each other, connection strength among the respective members (among the vane sections 2 and the tip shroud section 5 for example) is high, and therefore the coupled vanes 1 in use can be proof against high load (centrifugal force or such).

According to the prior art in contrast, as respective members were connected by applying adhesive or mechanically connected, there might be a case where strength at connecting part among the respective members were insufficient.

While the coupled vanes 1 according to the present embodiment exemplified in FIG. 1A have two vane sections, the number of the vane sections in the present embodiment is not particularly limited. The coupled vanes 1 according to the present embodiment may include two or more vane sections.

Further the present embodiment can be applied to turbine stator vanes in which the connecting sections are inner band sections or outer band sections. Here the connecting sections may be both the outer band sections and the inner band sections. More specifically, the coupled vanes according to the present embodiment may have two connecting sections, one as the outer band sections and the other as the inner band sections.

Figure 1B:
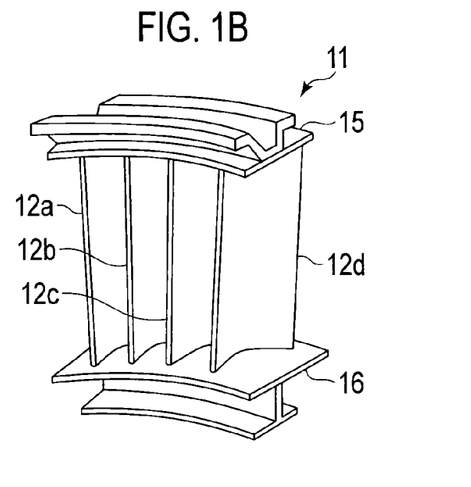
FIG. 1B is a schematic perspective view illustrating coupled vanes applied to stator vanes in accordance with the embodiment.

FIG. 1B is a schematic perspective view for illustrating the coupled vanes for the stator vanes in accordance with the present embodiment.

As shown in FIG. 1B, the coupled vanes 11 for the stator vanes according to the present embodiment include a plurality of (four, exemplified in FIG. 1B) vane sections. The coupled vanes 11 according to the present embodiment shown in FIG. 1B are comprised of four vane sections 12a,12b,12c,12d, which are mutually connected at these one ends and the other ends by the outer band section 15 and the inner band section 16.

To the coupled vanes 11 for the stator vanes according to the present embodiment as described, in use, strong load caused by gas flow is applied on these blade sections.

The coupled vanes 11 for the stator vanes according to the present embodiment exemplified in FIG. 1B, as described later in more detail, the respective fabrics are of ceramic fibers, and the coupled vanes 11 are produced by, after connecting four fabrics constituting four vane sections 12a, 12b,12c,12d (the fabrics for the vane sections) by the fabrics constituting the outer band section 15 (the fabrics for the connecting sections) and the inner band section 16, incorporating them into a mold and molding them into a unitary body, and impregnating the obtained molded body with the ceramic matrix. As fibers therein overlap each other, connection strength among the respective members (among the vane sections 12 and the outer band section 15 or the inner band section 16 for example) is high and therefore the coupled vanes 11 in use can be proof against high load.

According to the prior art in contrast, as respective members were connected by applying adhesive or mechanically connected, there might be a case where strength at connecting part among the respective members were insufficient.

While the coupled vanes 11 according to the present embodiment exemplified in FIG. 1B have four vane sections, the number of the vane sections in the present embodiment is not particularly limited. The coupled vanes 11 according to the present embodiment may include two or more vane sections, and may include still more vane sections, the number of which is four for example.

A production method of the composite members according to the present embodiment will be next described.

The production method for the composite members according to the present embodiment can be applied to the production of the coupled vanes used as turbine vanes. The method is a method for producing a ceramic matrix composite member, which is comprised of preparing the fabric (s) for the connecting section(s) and a plurality of fabrics for the vane sections, a step of connecting the plural fabrics of the vane sections by the fabric(s) for the connecting section (s), a step of molding by incorporating the connected fabrics body into a mold and molding it into a unitary body to obtain a molded body, and a step of impregnating by impregnating the molded body with a matrix. At the step of connecting, fibers in the respective fabrics are made to overlap each other and are thereafter impregnated with the matrix.

<Step of Connecting>

The step of connecting in the production method according to the present embodiment will be described hereinafter.

The step of connecting in the production method according to the present embodiment is a step of, based on the step of preparing the fabric(s) for the connecting section(s) and the plurality of fabrics for the vane sections, connecting the plurality of fabrics for the vane sections by the fabric for the connecting section to obtain a fabric-connected body. The step of connecting in a case for obtaining the coupled vanes for the rotor vanes according to the present embodiment and the step of connecting in a case for obtaining the coupled vanes for the stator vanes according to the present embodiment, based on the production method according to the present embodiment, will be respectively described below.

The step of connecting in the case for obtaining the coupled vanes for the rotor vanes will be described with reference to the drawings.

Unless otherwise described, the respective fabrics described below consist essentially of ceramic fibers, and more specifically fabrics without being impregnated with a matrix before the step of impregnating can be used. Or the fabrics may be partially or totally impregnated with the matrix in advance.

Figure 2A:
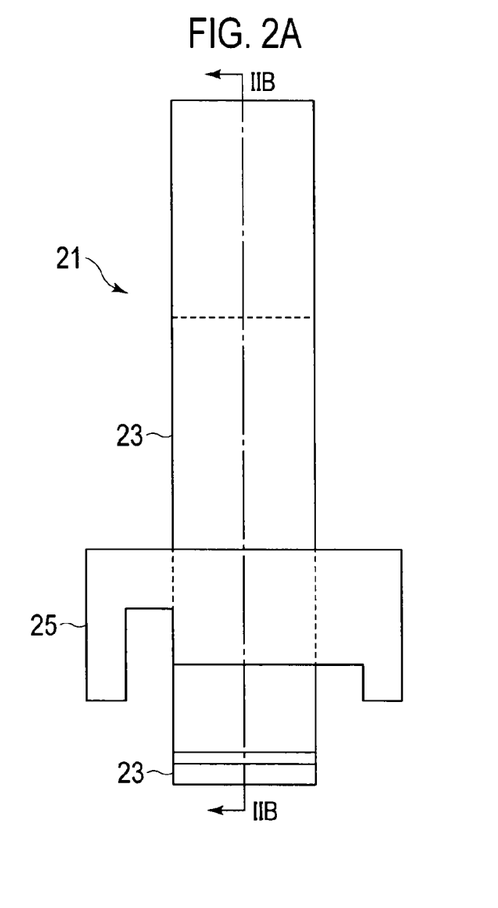
FIGS. 2A and 2B are schematic drawings illustrating a connecting step for obtaining the coupled vanes applied to the rotor vanes in accordance with the embodiment.
Figure 2B:
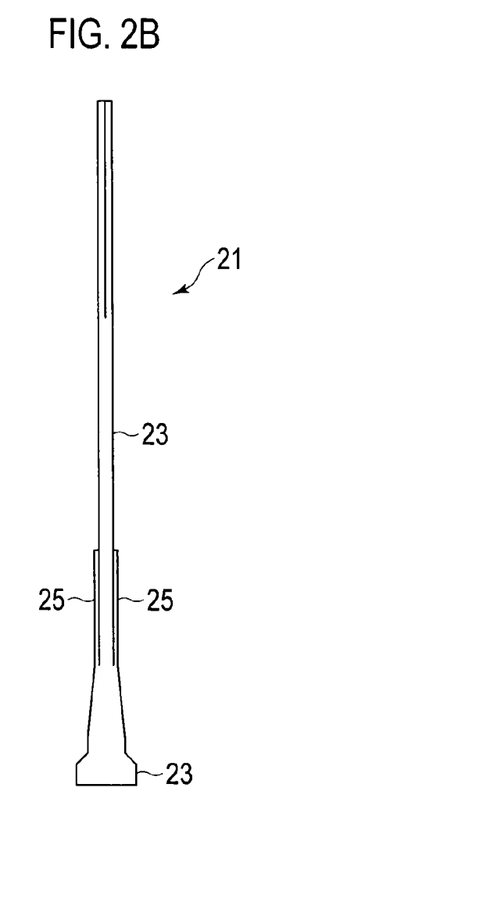

FIGS. 2A and 2B are drawings showing a fabric 21 in which a fabric 23 of ceramic fibers, which is to be a vane section and a dovetail section, is continuous with a fabric 25 of the ceramic fibers, which is to be a platform section, wherein FIG. 2A is a schematic side view and FIG. 2B is a sectional view taken from the line IIB-IIB in FIG. 2A.

The fabric 21 is a three-dimensional fabric that is three-dimensionally woven to have a considerable thickness as shown in FIG. 2B. Its lower end is a part to be the dovetail section and the fabric is so woven to, just above it, branch into three parts. The center of these three branching parts is a part to be the vane section, and those along both sides thereof are a pair of fabrics 25 in flange-like shapes, which are to be the platform section. The pair of fabrics 25 is so woven to be a shape adapted for overlapping each other when being bent as described later. The part to be the vane section is so woven to further branch into two parts at its upper portion. While the fabric 21 is a three-dimensional fabric, the totality of which is a unitary body, the fabric 21 may be formed by overlapping and sewing a plurality of fabrics together.

Figure 3A:
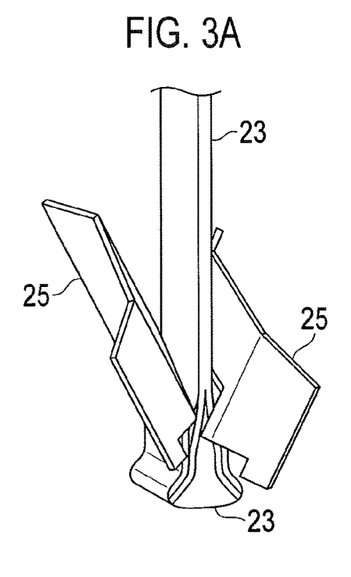
FIGS. 3A and 3B are the other schematic drawings illustrating the connecting step for obtaining the coupled vanes applied to the rotor vanes in accordance with the embodiment.

After obtaining the fabric 21 described above, as shown in FIG. 3A, the pair of fabrics 25 of the ceramic fibers to be the platform section is respectively bent in a desired angle (about 90 degrees in a case of a turbine rotor) so that the fabrics 25 overlap each other in parallel and these fibers overlap and get close contact with each other. Thereby the fabrics 25 connect together. Parts 251 which are to be two platform sections and where the fabrics 25 overlap each other may be stitched together. It is advantageous in further increasing strength of the obtained fabric for the vane section.

Figure 3B:
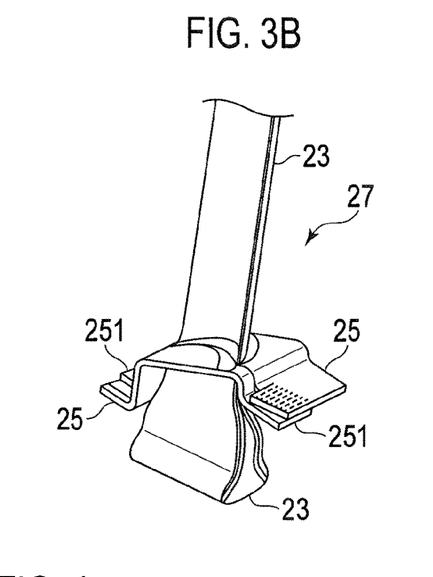
Figure 4:
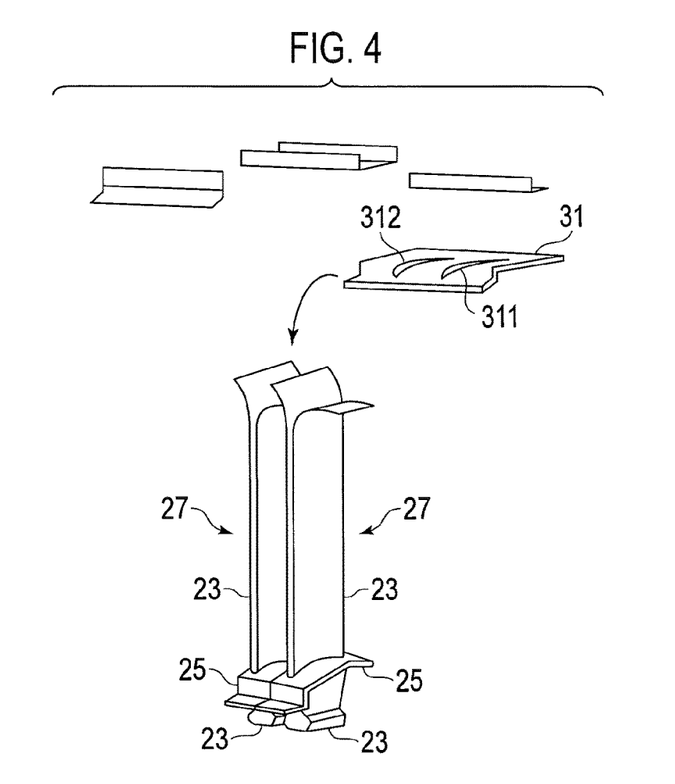
FIG. 4 is still another schematic drawing illustrating the connecting step for obtaining the coupled vanes applied to the rotor vanes in accordance with the embodiment.
Figure 5:
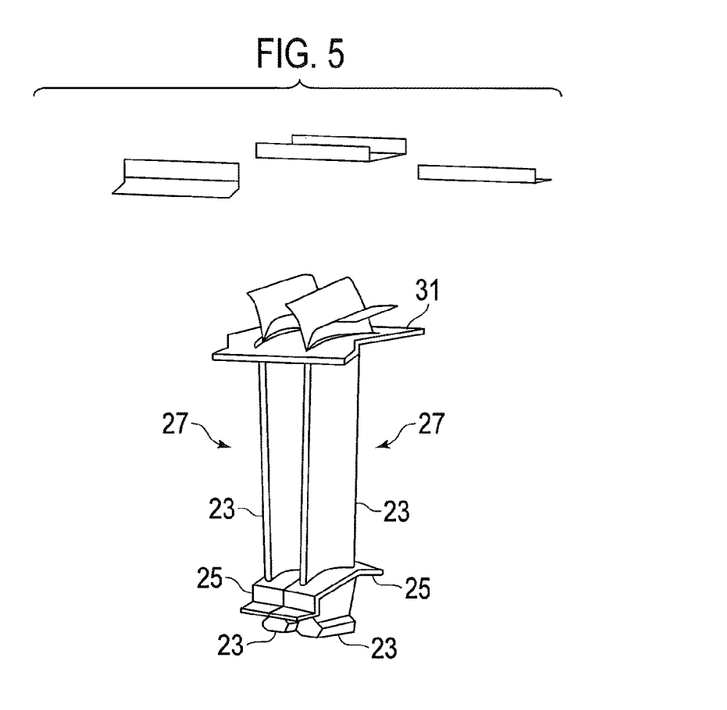
FIG. 5 is further still another schematic drawing illustrating the connecting step for obtaining the coupled varies applied to the rotor vanes in accordance with the embodiment.

A fabric 27 for the vane section of an embodiment shown in FIG. 3B is obtained in a way described above.

After obtaining a plurality of fabrics 27 for the vane sections shown in FIG. 3B in this way, the fabrics 27 for the vane sections are, in a way as shown in FIGS. 4, 5, 6 and 7, connected with a fabric 31 for the connecting section which will constitute the tip shroud section. In the meantime, the fabric for the connecting section is a generally rectangular fabric and is formed to have two through-holes allowing passage of one ends of the fabrics 27 for the vane sections. The through-holes can be formed by any known method such as machining.

While the fabric 31 for the connecting section has two through-holes 311,312, one ends of the fabrics 27 for the vane sections is made to pass through these through-holes. After respectively having ends of two fabrics 27a,27b for the vane sections to pass through the through holes 311,312, as shown in FIG. 6, parts passing therethrough are bent so as to become the connecting section.

Figure 6:
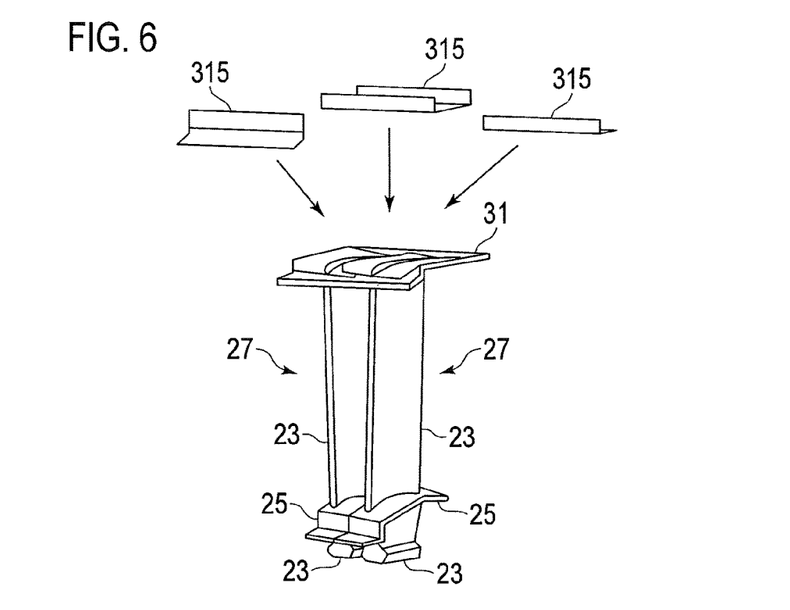
FIG. 6 is further still another schematic drawing illustrating the connecting step for obtaining the coupled vanes applied to the rotor vanes in accordance with the embodiment.
Figure 7:
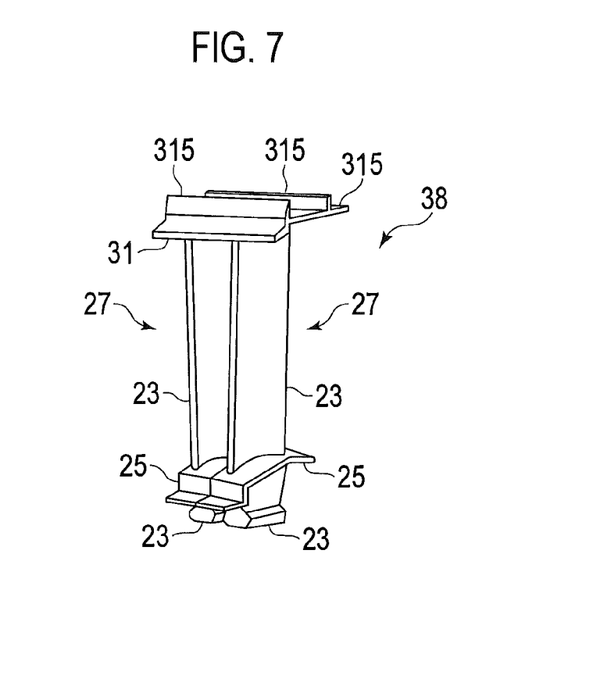
FIG. 7 is further still another schematic drawing illustrating the connecting step for obtaining the coupled vanes applied to the rotor vanes in accordance with the embodiment.

And, the other members 315 may be as shown in FIG. 6 added thereto, and a fabric connected body 38 as shown in FIG. 7 can be obtained. To put the bent ends between the fabric for the connecting section and the other members 315 contributes to improvement of strength.

Next the step of connecting in the case of obtaining the composite member for the stator vanes will be described with reference to the drawings.

Figure 8:
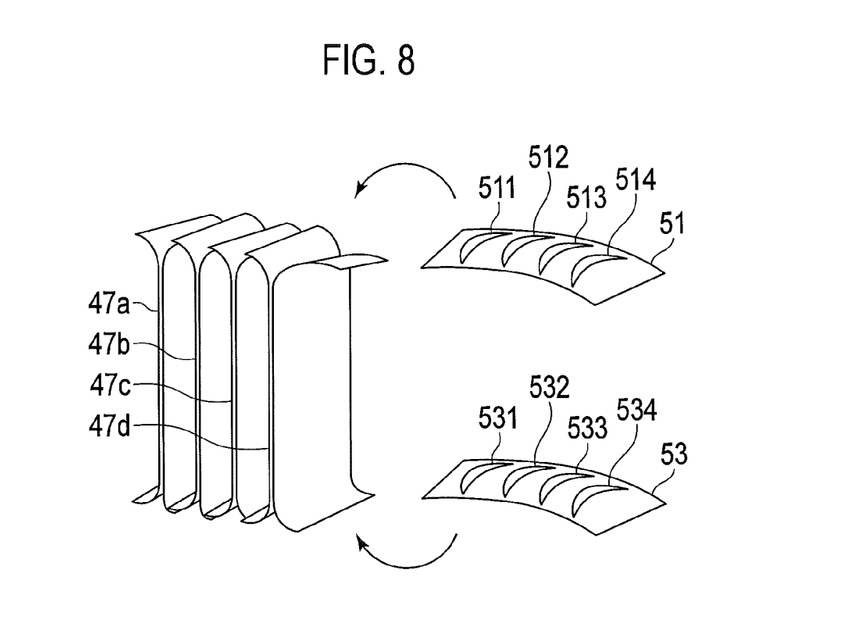
FIG. 8 is a schematic drawing illustrating a connecting step for obtaining the coupled vanes applied to the stator vanes in accordance with the embodiment.

FIG. 8 is a schematic drawing showing four fabrics 47a,47b,47c,47d, which will constitute the vane section, a fabric 51 for the connecting section, which will constitute the outer band section, and a fabric 53 for the connecting section, which will constitute the inner band section.

The fabric 51 for the connecting section, which will constitute the outer band section, and the fabric 53 for the connecting section, which will constitute the inner band section, are in general rectangular fabrics and are formed to have through holes which allow passage of ends of the respective fabrics 47a,47b,47c,47d for the vane sections as described later. The through-holes formed by any known method such as machining.

Figure 9:
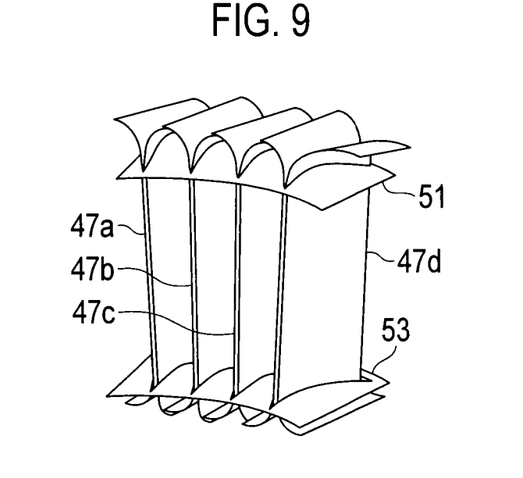
FIG. 9 is another schematic drawing illustrating the connecting step for obtaining the coupled vanes applied to the stator vanes in accordance with the embodiment.

A plurality of fabrics 47 for the vane sections is prepared and, in a way as shown in FIG. 9, connected with the fabrics 51,53 for the connecting section.

Figure 10:
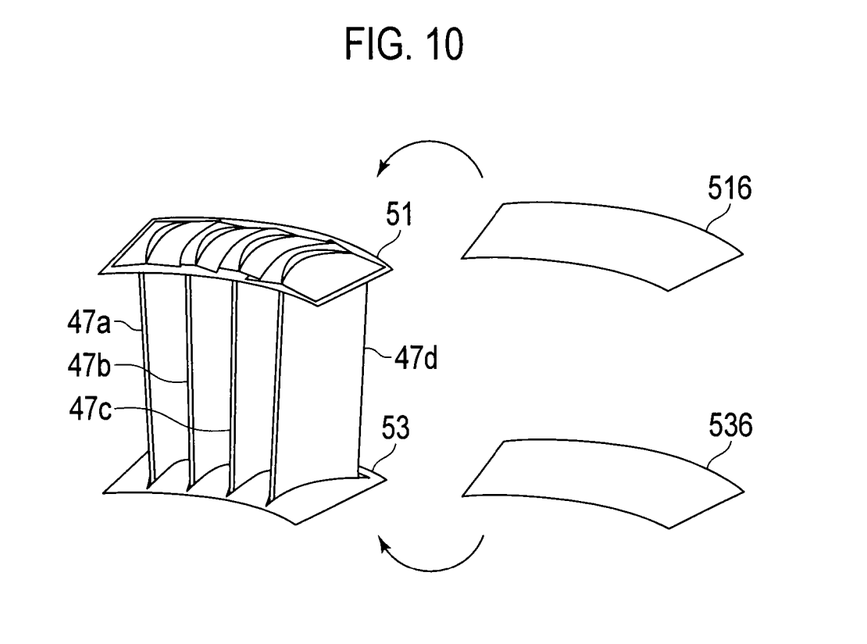
FIG. 10 is still another schematic drawing illustrating the connecting step for obtaining the coupled vanes applied to the stator vanes in accordance with the embodiment.
Figure 11:
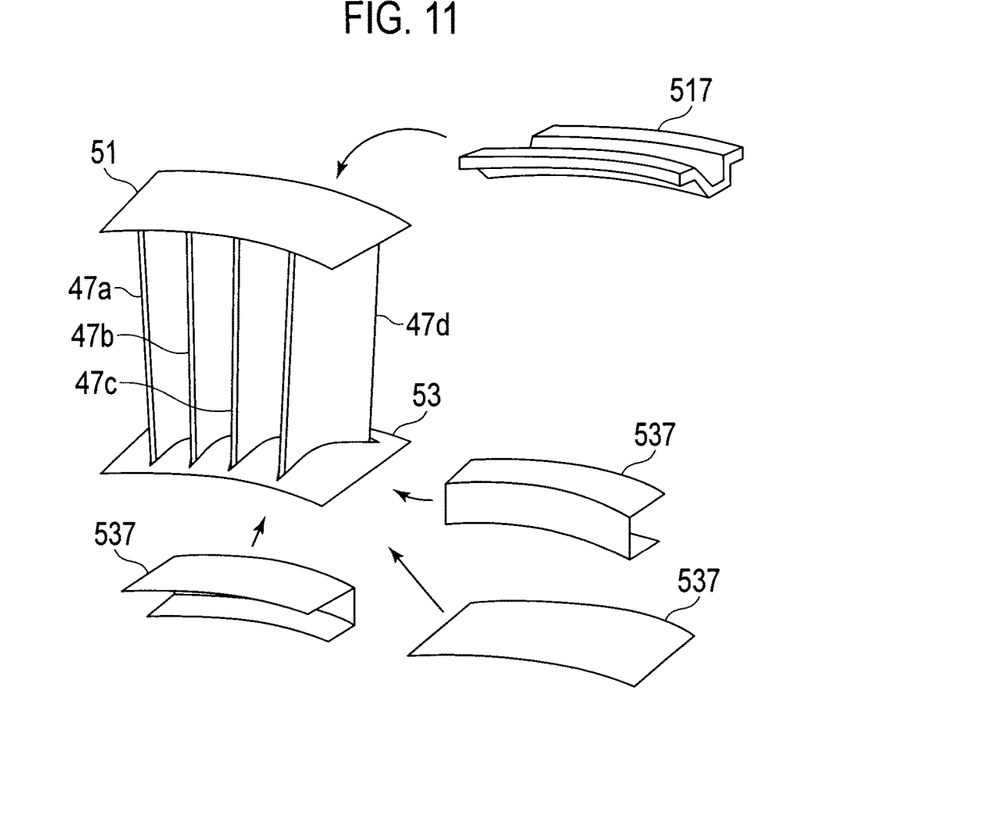
FIG. 11 is still another schematic drawing illustrating the connecting step for obtaining the coupled vanes applied to the stator vanes in accordance with the embodiment.
Figure 12:
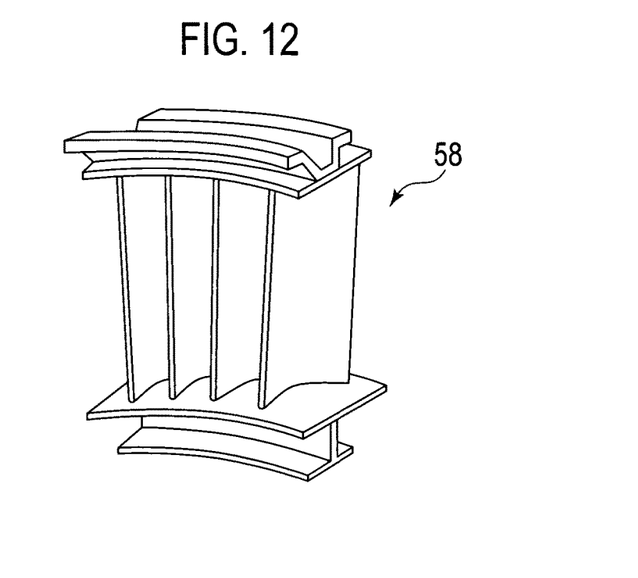
FIG. 12 is still another schematic drawing illustrating the connecting step for obtaining the coupled vanes applied to the stator vanes in accordance with the embodiment.

Here the fabrics 51,53 respectively have four through holes 511,512,513,514 and 531,532,533,534, and the ends of the fabrics 47 for the vane sections are made to pass through the through-holes. After having the ends of the four fabrics 47a,47b,47c,47d for the vane sections to pass through the four through-holes as shown in FIG. 10, the parts passing therethrough are, as shown in FIG. 10, bent so as to become the connecting section later. And, as shown in FIGS. 10 and 11, the other members 516,517 and 536,537 may be added thereto and then the fabric connected body 58 as shown in FIG. 12 is obtained.

The fabrics for the vane sections and the fabrics for the connecting sections as described above can be produced by a known method, and a fabric of a three-dimensional structure can be used. The fabric of the three-dimensional structure is, for example, obtained by bundling several hundred through several thousand of ceramic fibers to form a bundle of fibers, and weaving the bundle of fibers in X-,Y-,Z-directions. More concretely, for example, a fabric of a three-dimensional structure is obtained by, after obtaining a plurality of layers in which the bundle of fibers is arranged in the X-direction and the bundle of fibers is arranged in the Y-direction perpendicular thereto, overlaying these layers on each other and sewing them with the other bundle of fibers in a thickness direction (Z-direction). Processing is, if necessary, thereafter achieved to obtain the fabrics for the vane sections and the fabric for the connecting section in desired shapes.

In the meantime, the fabrics for the vane sections and the fabric for the connecting section may be those having a three-directional structure or may be those partially not having a three-directional structure.

Any particular limitation is given in regard to the material and its diameter of the ceramic fibers constituting the fabrics for the vane sections and the fabric for the connecting section. Ceramic fibers of SiC, C, $Si_3N_4$, $Al_2O_3$ or BN can be used. Further, the diameter of the ceramic fibers may be similar to that of the known ceramic fibers and may be about several through several tens micrometers for example.

<Step of Molding>

The step of molding in the production method according to the present embodiment will be described hereinafter.

The step of molding in the production method according to the present embodiment is a step of incorporating the fabric connected body into a mold and molding it into a unitary body to obtain a molded body.

In the step of molding, the fabric connected body obtained by the step of connecting as described above is incorporated into a mold and then molded. Into a mold dividable into six parts for example, the fabric connected body is incorporated and then molded. Internal shape of the mold is complementary to a shape of the desired molded body, and, by deforming the fabric connected body along the mold, the fabric connected body can be, inside the mold, molded into a unitary body.

<Step of Impregnating>

Next, the step of impregnating will be described hereinafter.

The step of impregnating is a step of impregnating the molded body with the matrix.

In the step of impregnating, a ceramic matrix is formed in the molded body by methods such as a step of chemical reaction from a gas or a step of pouring solid powder into the molded body and sintering it.

As the method exemplified is, for example, a method of exposing the molded body made to be the unitary body to ingredient gases in a chamber and depositing the matrix by chemical reaction onto surfaces of the molded body, or a method of impregnating the molded body made to be the unitary body with a substance (precursor), in which an ingredient powder solid is made to be slurry-like, and sintering it.

The ceramic matrix composite in accordance with the present embodiment can be obtained in a way as described above.

According to the embodiments as described above, fibers in one member (the vane section for example) go over the connecting part to reach the other member (the tip shroud section for example) and overlap with fibers in the other member, and thereby both these members are connected by the matrix. More specifically, the fibers are not discontinuous at the connecting part and both these fibers are, with considerable overlapping, connected together. Even when a force is applied to the connecting part, because the fibers extending beyond the connecting part reinforce it, sufficient strength comparable to that at the other parts can be expected.

Further according to the embodiments as described above, it is not necessary to impregnate the fabrics with the matrix in advance. Therefore the respective fabrics are still sufficiently flexible and can be therefore freely bent so as to have the fibers therein to get sufficiently close contact with each other, thereby enabling strong connection.

Although the invention has been described above by reference to certain embodiments of the invention, the invention is not limited to the embodiments described above. Modifications and variations of the embodiments described above will occur to those skilled in the art, in light of the above teachings.

INDUSTRIAL APPLICABILITY

Coupled vanes for a turbine with sufficient strength and its production method are provided.

What is claimed is:

1. A method for producing coupled vanes of a turbine having an axis, comprising:
   arranging a plurality of first fabrics of ceramic fibers in radial directions relative to the axis to form a plurality of vane sections;
   arranging a second fabric of the ceramic fibers in a circumferential direction relative to the axis;
   connecting the first fabrics with the second fabric by bending and laying first ends of the first fabrics on the second fabric in parallel;

laying third fabrics of the ceramic fibers, each of the third fabrics having a flange section, on the first fabrics;

bending the flange sections to make ends of the flange sections overlap with each other and to make the flange sections form a platform section;

incorporating the first fabrics connected with the second fabric into a mold to mold the first and second fabrics into a unitary body; and impregnating the plurality of first fabrics and the second fabric molded into the unitary body with a matrix.

2. The method of claim 1, wherein the second fabric has a shape of a tip shroud section or an outer band section.

3. The method of claim 1, wherein the second fabric has through-holes allowing passage of the first ends, further comprising:

getting the first ends through the through-holes before the step of connecting.

4. The method of claim 1, further comprising:

arranging a fourth fabric of the ceramic fibers in the circumferential direction relative to the axis; and bending and laying second ends of the first fabrics on the fourth fabric before the step of impregnating.

5. The method of claim 1, wherein the ceramic fibers do not include the matrix before the step of impregnating.

6. Coupled vanes of a turbine having an axis, comprising:

a plurality of vane sections comprising a plurality of first fabrics of ceramic fibers arranged in radial directions relative to the axis;

a tip shroud section or an outer band section, wherein a second fabric of the ceramic fibers is arranged in a circumferential direction relative to the axis; and a platform section wherein third fabrics of the ceramic fibers, each of the third fabrics having a flange section, are laid on the first fabrics, and the flange sections are bent to make ends of the flange sections overlap with each other and to make the flange sections form the platform section, wherein the first fabrics are connected with the second fabric by bending and laying first ends of the first fabrics on the second fabric in parallel, wherein the first and second fabrics are molded into a unitary body by incorporating the first fabrics connected with the second fabric into a mold, and wherein the plurality of first fabrics and the second fabric molded into the unitary body is impregnated with a matrix.

* * * * *